US012564979B2

(12) United States Patent　　　(10) Patent No.:　US 12,564,979 B2
　　　Kim et al.　　　　　　　　　　　(45) Date of Patent:　　Mar. 3, 2026

(54) SECONDARY BATTERY ELECTRODE SURFACE PRESSURE CUTTING DEVICE USING ADJUSTMENT MODULE

(71) Applicant: Sung Yong Kim, Chungcheongbuk-do (KR)

(72) Inventors: Sung Yong Kim, Chungcheongbuk-do (KR); Ki Hoon Lee, Chungcheongbuk-do (KR)

( * ) Notice: Subject to any disclaimer, the term of this patent is extended or adjusted under 35 U.S.C. 154(b) by 115 days.

(21) Appl. No.: 18/661,629

(22) Filed: May 12, 2024

(65) Prior Publication Data

US 2024/0408783 A1　　Dec. 12, 2024

(51) Int. Cl.
　　*B26D 7/26*　　　(2006.01)
　　*B26D 1/08*　　　(2006.01)
　　*H01M 10/04*　　(2006.01)

(52) U.S. Cl.
　　CPC ........... *B26D 7/2628* (2013.01); *B26D 1/085* (2013.01); *B26D 7/2614* (2013.01); *H01M 10/0404* (2013.01)

(58) Field of Classification Search
　　CPC ..... B26D 7/2628; B26D 7/2614; B26D 1/085
　　See application file for complete search history.

(56) References Cited

U.S. PATENT DOCUMENTS

| 4,416,176 | A | * | 11/1983 | Forthmann | ............ | B26D 1/085 |
| | | | | | | 83/628 |
| 4,958,545 | A | * | 9/1990 | Lenzotti | ............... | B23D 15/002 |
| | | | | | | 83/639.1 |
| 5,347,699 | A | * | 9/1994 | Ward | ........................ | B26D 3/12 |
| | | | | | | 83/695 |
| 5,875,699 | A | * | 3/1999 | Koelsch | ............... | B26D 7/2628 |
| | | | | | | 83/695 |

(Continued)

*Primary Examiner* — Omar Flores Sanchez
(74) *Attorney, Agent, or Firm* — Patshegen IP; Moshe Pinchas

(57)　　　　　　　　ABSTRACT

The present disclosure relates to a device for cutting a secondary battery electrode, and more particularly, to a secondary battery electrode surface pressure cutting device including upper and lower blades configured to cut a secondary battery electrode and using a modularized adjustment module to finely adjust the upper blade. In order to achieve the above-mentioned object of the present disclosure, the present disclosure provides a secondary battery electrode surface pressure cutting device using an adjustment module, the surface pressure cutting device including an upper blade fixedly fastened to a moving block in a frame, and a lower blade fixedly fastened in a lower blade fixing block, in which the upper blade may cut an electrode while moving upward or downward, and the upper blade fixedly fastened to the moving block may be finely adjusted. The adjustment module may include a threaded part having a protrusion portion formed at one side thereof, a spring fitted with the protrusion portion, an adjustment member having an adjustment guide formed at a side opposite to a fitting (Continued)

portion so as to be fitted with the other side of the spring, and an O-ring fitted with the adjustment guide. In addition, the adjustment guide may have a shape tapered outward. In addition, the frame and the moving block have an adjustment module fitting hole into which the adjustment module is inserted to adjust the upper blade.

1 Claim, 3 Drawing Sheets

(56) References Cited

U.S. PATENT DOCUMENTS

| | | | |
|---|---|---|---|
| 2007/0107578 A1* | 5/2007 | Koelsch | B26D 7/2628 |
| | | | 83/698.61 |
| 2011/0277608 A1* | 11/2011 | Meznaric | B26D 7/2614 |
| | | | 83/331 |
| 2023/0139021 A1* | 5/2023 | Dumoulin | B26D 7/2628 |
| | | | 28/226 |
| 2024/0123645 A1* | 4/2024 | Fischer | B26D 7/2628 |

* cited by examiner

[FIG. 1]
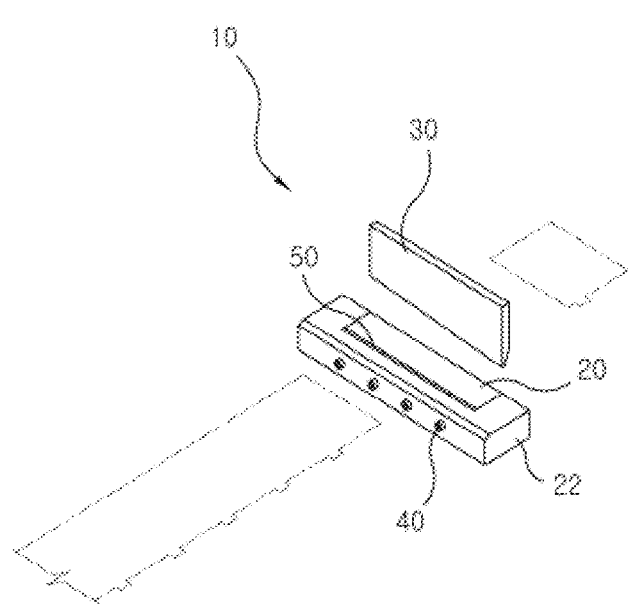
[FIG. 2]
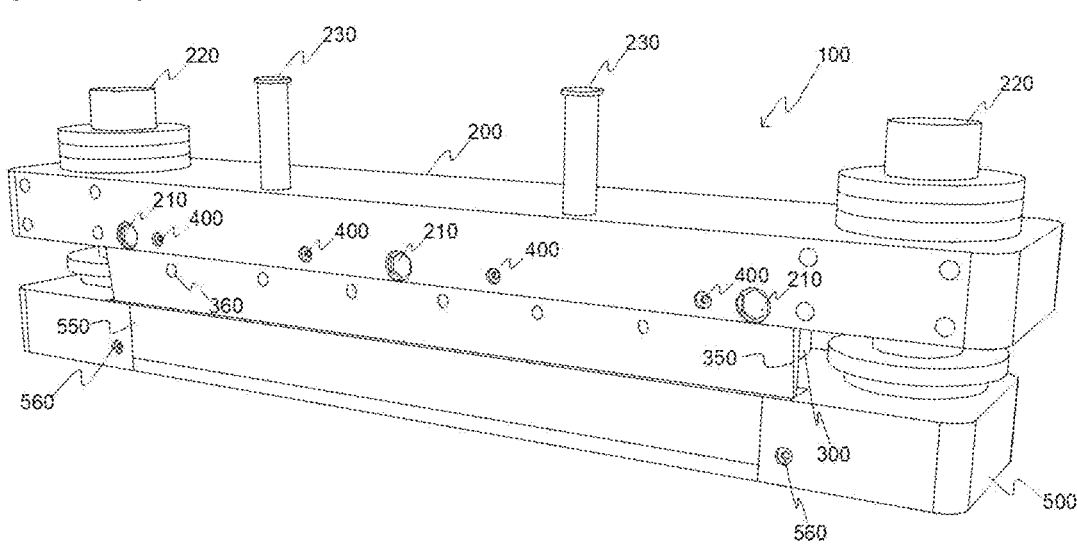

[FIG. 3]
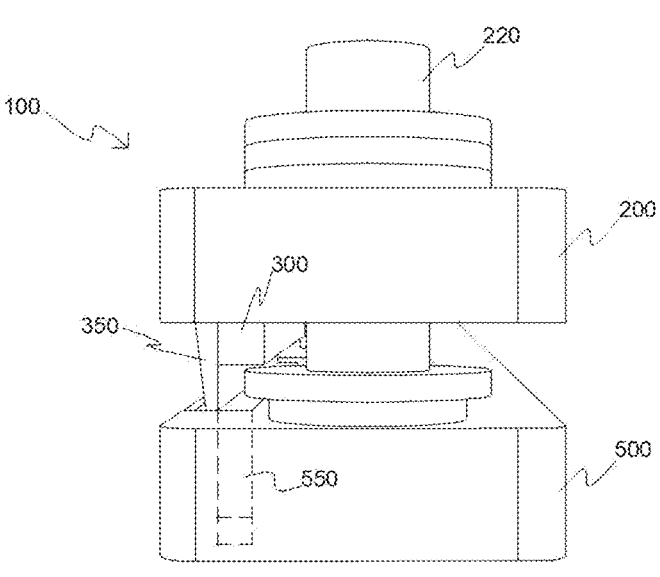
[FIG. 4]
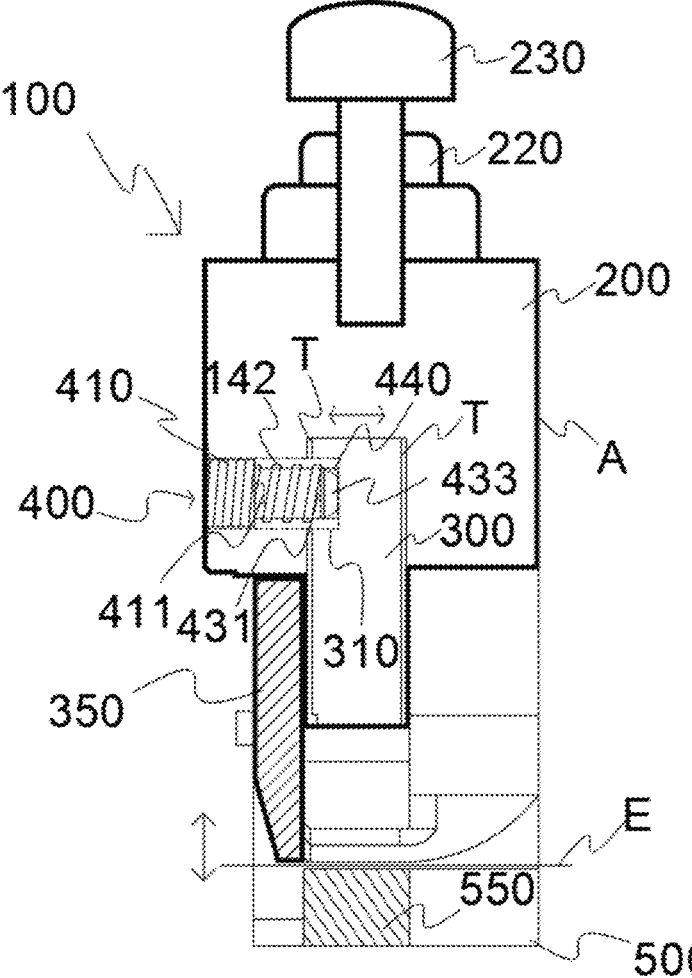

[FIG. 5]
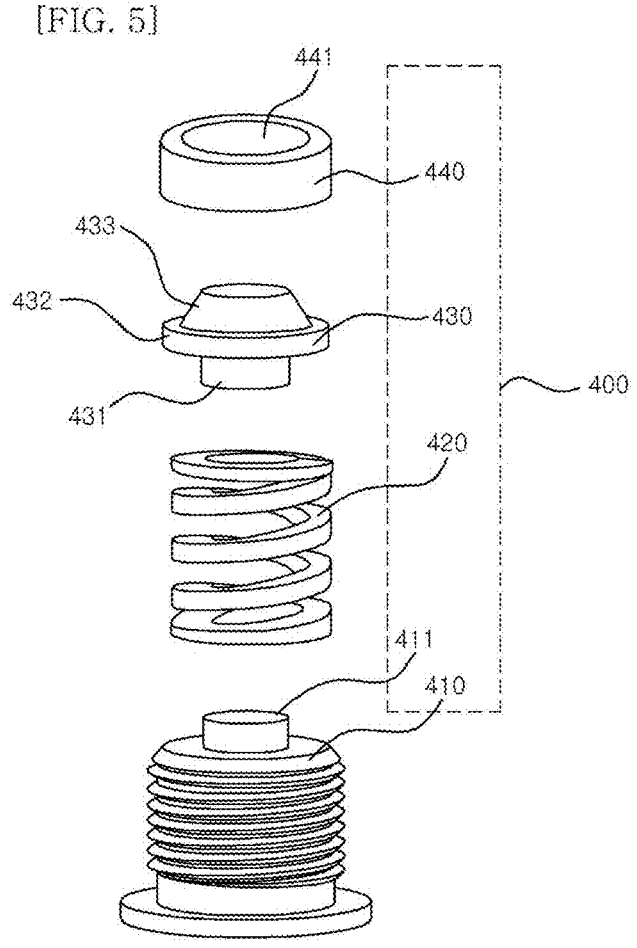
[FIG. 5A]
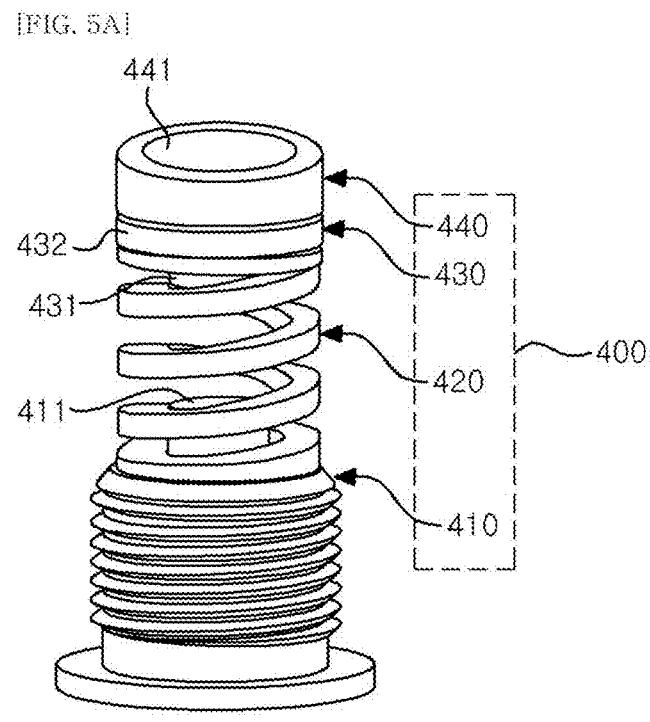

1

SECONDARY BATTERY ELECTRODE SURFACE PRESSURE CUTTING DEVICE USING ADJUSTMENT MODULE

CROSS-REFERENCE TO RELATED APPLICATIONS

This application claims the priority of Korean Patent Application No. 10-2023-0061540 filed on May 12, 2023, in the Korean Intellectual Property Office, the disclosure of which is incorporated herein by reference.

BACKGROUND

Field

The present disclosure relates to a device for cutting a secondary battery electrode, and more particularly, to a secondary battery electrode surface pressure cutting device including upper and lower blades configured to cut a secondary battery electrode and using a modularized adjustment module to finely adjust the upper blade.

Description of the Related Art

In general, a notching process, which shears an electrode during a process of manufacturing an electrode of a secondary battery, uses an unwinder part configured to unwind the electrode wound in the form of a roll, a notching processing part configured to shear the electrode by using a press, and a vision inspection part configured to inspect whether the processed electrode has been normally processed.

During the notching processing, a cutting process is performed to manufacture unit electrodes by shearing the electrode. Typically, in order to cut the electrode, a scaffold-type cutting device is mainly used to an electrode sheet in a direction perpendicular to a conveyance direction of the electrode sheet.

FIG. 1 attached hereto is a schematic view of a general cutting device, i.e., a conceptual view illustrating the cutting device typically used to cut an electrode.

As can be understood by those skilled in the art, a cutting device 10 illustrated in FIG. 1 is used to manufacture unit electrodes u by cutting an electrode sheet S between a lower blade 20 and an upper blade 30.

The cutting device in the related art will be described.

First, Korean Patent No. 10-2469560 (registered on Nov. 17, 2022) discloses a secondary battery electrode cutting device in order to prevent a problem with the cutting device in the related art illustrated in FIG. 1 and using the upper blade 30 and the lower blade 20, i.e., a problem of the occurrence of burrs or the non-uniformity of cut surfaces caused by a deformation in shape of the lower blade 20.

Korean Patent No. 10-2469560 aims to provide the secondary battery electrode cutting device in which the lower blade is installed on a lower blade frame to prevent a shape of the lower blade from being deformed, i.e., the secondary battery electrode cutting device capable of easily adjusting a clearance and being easily installed on the lower blade frame to correspond to the pushing motion of the upper blade.

Therefore, Korean Patent 10-2469560 relates to the lower blade of the device for cutting the secondary battery electrode and is a completely different invention from the upper blade of the cutting device that is the spirit of the present disclosure.

Meanwhile, Korean Patent Application Laid-Open No. 10-2022-0013247 (published on Feb. 4, 2022) aims to provide a power transmission unit for an electrode cutting device including a structure capable of preventing a situation in which cut surfaces of electrode sheets are not uniform and a machining force is decreased because of the occurrence of tolerance in the electrode cutting device caused when a process of cutting the electrode sheets is repeated.

In order to achieve the object, Korean Patent Application Laid-Open No. 10-2022-0013247 discloses constituent elements, such as an upward/downward movable lifting block, an upper frame for mounting an upper blade holder, a connection shaft between the lifting block and the upper frame, and an elastic member on an upper portion of the connection shaft, in order to provide the power transmission unit.

It can be seen that Korean Application Laid-Open No. 10-2022-0013247 relates to power transmission of the cutting device and has been made with a completely different intention from the present disclosure.

As described above, the development has been conducted on the cutting device, which cuts the secondary battery electrode by using the upper and lower blades, in order to prevent a problem of a change in shape of the lower blade or a problem of tolerance between the upper and lower blades caused by the repeated cutting process.

Therefore, there is a need for a method or technology capable of solving the problem of tolerance, which may occur between the upper and lower blades when the cutting device is assembled or used, or the problem of tolerance caused by the repeated use of the cutting device, and coping with the non-uniformity of the cut surfaces or the occurrence of burrs caused by these problems.

DOCUMENTS OF RELATED ART

Patent Documents (Patent Document 1) Korean Patent No. 10-2469560 (registered on Nov. 17, 2022)

(Patent Document 2) Korean Patent Application Laid-Open No. 10-2022-0013247 (published on Feb. 4, 2022)

SUMMARY

An object to be achieved by the present disclosure is to provide a cutting device for a secondary battery electrode, which is a surface pressure-type cutting device for a secondary battery electrode and is capable of coping with the non-uniformity of cut surfaces and preventing the occurrence of burrs by using an adjustment module capable of bringing an upper blade into precisely close contact with a lower blade, thereby producing electrodes, which are smoothly cut in desired shapes, while preventing the occurrence of burrs and the non-uniformity of the cut surfaces caused by tolerance or the like that was considered as a problem in the related art.

In order to achieve the above-mentioned object of the present disclosure, the present disclosure provides a secondary battery electrode surface pressure cutting device using an adjustment module, the surface pressure cutting device including an upper blade fixedly fastened to a moving block in a frame, and a lower blade fixedly fastened in a lower blade fixing block, in which the upper blade may cut an electrode while moving upward or downward, and the upper blade fixedly fastened to the moving block may be finely adjusted.

The adjustment module may include a threaded part having a protrusion portion formed at one side thereof, a spring fitted with the protrusion portion, an adjustment member having an adjustment guide formed at a side opposite to a fitting portion so as to be fitted with the other side of the spring, and an O-ring fitted with the adjustment guide.

In addition, the adjustment guide may have a shape tapered outward.

In addition, the frame and the moving block have an adjustment module fitting hole into which the adjustment module is inserted to adjust the upper blade.

According to the present disclosure, it is possible to provide the secondary battery electrode surface pressure cutting device that is the secondary battery electrode cutting device that uses the upper blade fixedly fastened to the moving block fixedly fastened to the frame and having fine spaces at two opposite sides and uses the lower blade fixedly fastened in the lower fixing block, in which the upper blade is moved upward or downward by using the adjustment module that may finely adjust the upper blade toward the lower blade. The occurrence of tolerance between the upper and lower blades may be prevented by the optimal surface pressure between the upper blade and the fixed lower blade, thereby smoothly cutting the electrode in a desired shape without the occurrence of burrs on the cut electrode or the non-uniformity of the cut surface.

BRIEF DESCRIPTION OF THE DRAWINGS

The above and other aspects, features and other advantages of the present device will be more clearly understood from the following detailed description taken in conjunction with the accompanying drawings, in which:

FIG. 1 is a schematic perspective view of a cutting device in the related art;

FIG. 2 is a schematic perspective view of a surface pressure cutting device of the present disclosure;

FIG. 3 is a schematic perspective side view of the surface pressure cutting device of the present disclosure;

FIG. 4 is a perspective side view of a main part of the surface pressure cutting device of the present disclosure;

FIG. 5 is a development photograph of a module used for the surface pressure cutting device of the present disclosure; and FIG. 5A is a development photograph of the disassembled module used for the surface pressure cutting device of the present disclosure.

DETAILED DESCRIPTION OF THE EMBODIMENT

Hereinafter, the present disclosure will be described in more detail with reference to the accompanying drawings.

The following description is intended to assist in understanding and practicing the present disclosure and is not intended to limit the present disclosure.

In addition, it will be understood by those skilled in the art, to which the present disclosure pertains, that the present disclosure may be variously modified, altered, or changed without departing from the spirit of the present disclosure defined by the appended claims.

In addition, it is noted that in the description of the present disclosure, specific descriptions of the publicly-known components, which may be easily understood by those skilled in the art or be apparent to those skilled in the art, will be omitted.

FIG. 2 is a schematic perspective view of a surface pressure cutting device 100 of the present disclosure. The surface pressure cutting device 100 includes a moving block 300 fixedly fastened in a frame 200, an upper blade 350 fixedly fastened to the moving block 300, and a lower blade 550 fixedly fastened to a lower blade fixing block 500.

The moving block 300 is supported by moving block support bushings 210, and the upper blade 350 is fastened to the moving block 300 by fasteners 360.

In addition, the lower blade 550 is fixedly fastened in the lower blade fixing block 500 by lower blade fixing bolts 560.

The moving block 300, to which the upper blade 350 is fixedly fastened, and the frame 200, to which the moving block 300 is fixedly fastened while being accommodated in the frame 200, may be configured to be moved upward or downward as a whole by a non-illustrated power transmission device by means of guides 220 and cartridge fixing parts 230.

The upper blade 350 moves upward or downward to cut an electrode that passes between the upper blade 350 and the lower blade 550 at the lower side.

The configuration of the cutting device is a typical. The designation of the components of the cutting device may be expressed differently, but the components are identical to general components.

That is, as illustrated in FIG. 3, the surface pressure cutting device 100 includes the moving block 300 fixedly fastened to the frame 200, the upper blade 350 fixedly fastened to the moving block 300, and the lower blade 550 fixedly fastened to the lower blade fixing block 500. The upper blade 350 is moved upward or downward by the non-illustrated power transmission by means of the guides 220 and the cartridge fixing parts 230 in FIG. 2, such that the upper blade 350 cuts the secondary battery electrode that passes between the upper blade 350 and the lower blade 550.

In general, the components are assembled to completely manufacture the cutting device.

The general structure of the cutting device in the present disclosure is characterized by finely adjusting the upper blade 350, which is fixedly fastened to the moving block 300, by using adjustment modules 400 in FIG. 2.

Hereinafter, the feature of the present disclosure will be described in detail with reference to the embodiment.

First, with reference to FIG. 4, FIG. 4 is a schematic side view illustrating a main feature of the surface pressure cutting device 100 of the present disclosure. The surface pressure cutting device 100 includes the moving block 300 to which the upper blade 350 is fixedly fastened, the frame 200 to which the moving block 300 is fixedly fastened while being accommodated in the frame 200, and the lower blade 550 fixedly fastened to the lower blade fixing block 500 at the lower side. The upper blade 350 fixedly fastened to the moving block 300 is moved upward or downward by the non-illustrated power transmission device by means of the cartridge fixing parts 230 and the guides 220 connected to the frames 200. A movement speed or the like is set by an inputted value.

That is, the guide 220, the cartridge fixing part 230, the frame 200, the moving block 300, and the upper blade 350, which are components illustrated in within the bold line A in FIG. 4, are configured to be integrally movable upward or downward, and the lower blade 550 is fixed, such that a secondary battery electrode E, which passes between the upper blade 350 and the lower blade 550, is cut by the upper blade 350 that moves upward or downward.

In this case, the moving block 300 accommodated in and fixedly fastened to the frame 200 has fine clearances T at left and right sides based on the drawing when the moving block 300 is fixedly fastened.

In general, the clearances T are about 1 mm at the left and right sides.

The present disclosure was completed through trial and error on the determination that when the moving block 300, to which the upper blade 350 is fixedly fastened, may be finely moved inward by using the clearances T between the moving block 300 and the frame 200, the upper blade 350 may be finely moved toward the lower blade 550 at the lower side, thereby forming smoother cut surfaces and preventing the occurrence of burrs during the surface pressure cutting.

First, the present disclosure is characterized in that the moving block 300 may be finely moved toward the inside of the frame 200 by adjusting the adjustment module 400 in FIG. 4, which is illustrated as the adjustment module 400 in FIG. 2, such that a surface pressure of the cutting device 100 may be adjusted by finely moving and adjusting the upper blade 350, which is fixedly fastened to the moving block 300, toward the lower blade 550.

With reference back to FIG. 4, in order to carry out the present disclosure with the aforementioned feature, the moving block 300 needs to be finely moved to the right side based on FIG. 4 by the adjustment modules 400. To this end, it is necessary to provide a space into which the adjustment module 400 may be inserted.

Therefore, the frame 200 and the moving block 300 have adjustment module fitting holes 310 into which the adjustment modules 400 may be inserted.

The adjustment module fitting hole 310 has a length that enables the adjustment module 400 to be fitted into the adjustment module fitting hole 310. The adjustment module fitting hole 310 is formed straight between the frame 200 and the moving block 300.

As illustrated in FIG. 5, the adjustment module 400 includes a threaded part 410 having a protrusion portion 411, a spring 420, an adjustment member 430 having a fitting portion 431 formed at one side thereof, an adjustment guide 433 formed at the other side thereof, and a contact portion 432 formed between the fitting portion 431 and the adjustment guide 433, and an O-ring 440 having an insertion hole 441 formed at a center thereof.

As illustrated in FIG. 5A, in the adjustment module 400, which is configured as described above, the spring 420 is fitted with the protrusion portion 411 formed on the threaded part 410, and the fitting portion 431 of the adjustment member 430 is fitted with the other side of the spring 420. Therefore, when the fitting portion 431 is fitted with the spring 420, the contact portion 432 of the adjustment member 430 is in contact with an outer portion of the spring 420.

In the aligned state described above, the adjustment guide 433 of the adjustment member 430 is inserted into the insertion hole 441 of the O-ring 440.

When the adjustment module 400 is aligned and fitted into the adjustment module fitting hole 310, the adjustment module 400 finely pushes the moving block 300 by using a force generated when the threaded part 410 is pressed and rotated through a wrench hole or the like at an outer side of the threaded part 410, such that the upper blade 350 fixedly fastened to the moving block 300 is also finely pushed toward the lower blade 550.

In order to implement the above-mentioned operations, the protrusion portion 411 at the outer side of the threaded part 410 is shaped to correspond to and be fitted with an inner diameter of the spring 420, and the contact portion 432 of the adjustment member 430 is formed to correspond to an outer diameter of the spring 420.

In addition, the adjustment guide 433 of the adjustment member 430 has a shape tapered outward, such that the adjustment guide 433 is fitted into the insertion hole 441 of the O-ring 440. An outer diameter of the O-ring 440 is equal to an outer diameter of the contact portion 432 of the adjustment member 430, such that a transmitted force is constant.

The use of the adjustment module 400 will be described with reference to FIGS. 4 and 5A. When the threaded part 410 (see FIG. 2) of the adjustment module 400 is pressed and rotated at the outer side of the frame 200 of the surface pressure cutting device 100 configured as illustrated in FIG. 4, the force is transmitted to the moving block 300 through the spring 420 fitted with the protrusion portion 411 of the threaded part 410, the adjustment member 430 fitted with the spring 420, the contact portion 432 of the adjustment member 430, and the O-ring 440 fitted with the contact portion 432, and the moving block 300 is finely moved by the force, such that the upper blade 350 fixedly fastened to the moving block 300 is finely moved and adjusted toward the lower blade 550.

FIG. 2 illustrates four adjustment modules 400, but three adjustment modules 400 may be provided.

If three or fewer adjustment modules 400 are used, the instability occurs because of an interval between the adjustment modules 400 when the upper blade 350 moves toward the lower blade 550. If four or more adjustment modules 400 are used, there is no special effect, but only costs are increased, and the working time is lengthened. Therefore, three to four adjustment modules 400 disposed at equal intervals may be used.

Experimental Example 1

In consideration of thicknesses and the like of the frame 200 and the moving block 300 typically assembled, fastened, and configured, the threaded part 410, in which a thread length was set to about 9 mm, about 9.3 mm, and about 9.5 mm, the spring 420, which was configured as a compression spring having a total length of about 10 mm and a maximum load of 196 N (20 kgf), the adjustment member 430, and the O-ring 440 were prepared, and the assembly module 400 was completed.

The adjustment module fitting holes 310, which penetrated the frame 200 and the moving block 300 straight, were formed before the surface pressure cutting device 300 was assembled and fixedly fastened, and then the surface pressure cutting device 100 was configured.

First, the cut surfaces were sometimes smooth according to a result of cutting the electrode E by manually moving the upper blade 350 upward and then moving the upper blade 350 downward before the use of the adjustment module 400 of the present disclosure. However, in some cases, the cut surfaces were slightly uneven because of the clearances T between the frame 200 and the moving block 300.

Next, the text using the adjustment module 400 of the present disclosure was performed.

The adjustment module 400 was used for the fixedly fastened cutting device 100, as illustrated in FIG. 5A.

First, when the threaded part 410, in which the thread length was about 9 mm, was used to push the spring by 0.2 mm by applying a force of 3.92 N (1.4 kgf), the cut surface was smooth, and almost no noise occurred.

Second, the threaded part, in which the thread length was about 9.3 mm, was used, and the thread length was relatively long. According to a result of pushing the spring by 0.05 mm by applying a force of 9.6 N (1.0 kgf), it can be seen that the cut surface has high quality, but noise occurs, which may affect a surrounding environment.

Third, the threaded part, in which the thread length was about 9.5 mm, was used, and the thread length was long. According to a result of pushing the spring by about 0.7 mm by applying a force of 13.72 N (1.4 kgf) and cutting the surface, it can be seen that the cut surface has high quality, but severe noise occurs, which causes noise pollution.

According to the test result, a higher force is required to press the spring 420 by the same length as the length of the threaded portion of the threaded part 410 increases, and noise occurs because of pressure applied to the spring 420. Therefore, the determination indicates that the most optimal state is a state in which the thread length of the threaded part 410 is about 9 mm, the length of the spring 420 is about 10 mm, and the maximum load of the spring 420 is 196 N (20 kgf).

What is claimed is:

1. A secondary battery electrode surface pressure cutting device (100) using an adjustment module, the secondary battery electrode surface pressure cutting device comprising:

an upper blade (350) fixedly fastened to a moving block (300) installed on a frame (200); and a lower blade (550) fixedly fastened to a lower blade fixing block (500), wherein the upper blade (350) cuts an electrode (E) while moving upward or downward, wherein an adjustment module fitting hole (310) is formed at one side of the frame (200) and the moving block (300), wherein an adjustment module (400), which includes a threaded part (410) having a protrusion portion (411) formed at an outer side thereof, a spring (420), an adjustment member (430) having a fitting portion (431) formed at one side thereof, an adjustment guide (433) formed at the other side thereof, and a contact portion (432) formed at a center thereof, and an O-ring (440) configured to be inserted into the adjustment guide (433), is fitted into the fitting hole (310), wherein the upper blade (350) fixedly fastened to the moving block (300) is pushed toward the lower blade (550) by finely moving the moving block (300) by applying a force to the spring (420) through the threaded part (410) of the adjustment module (400), and wherein a thread length of the threaded part (410) of the adjustment module (400) is 9 mm, and the spring 420 is a compression spring and has a length of 10 mm and a maximum load of 196 N (20 kgf).

* * * * *